United States Patent
Bernardi et al.

(10) Patent No.: US 9,915,065 B2
(45) Date of Patent: Mar. 13, 2018

(54) INSULATING MINERAL FOAM

(71) Applicant: LAFARGE, Paris (FR)

(72) Inventors: Sebastien Bernardi, Saint Quentin Fallavier (FR); Isabelle Javierre, Saint Quentin Fallavier (FR); Sylvain Duchand, Saint Quentin Fallavier (FR); Serge Sabio, Saint Quentin Fallavier (FR); Cedric Roy, Saint Quentin Fallavier (FR)

(73) Assignee: LAFARGE, Paris (FR)

( * ) Notice: Subject to any disclaimer, the term of this patent is extended or adjusted under 35 U.S.C. 154(b) by 0 days.

(21) Appl. No.: 14/390,713

(22) PCT Filed: Apr. 5, 2013

(86) PCT No.: PCT/EP2013/057238
§ 371 (c)(1),
(2) Date: Oct. 3, 2014

(87) PCT Pub. No.: WO2013/150148
PCT Pub. Date: Oct. 10, 2013

(65) Prior Publication Data
US 2015/0083958 A1    Mar. 26, 2015

(30) Foreign Application Priority Data
Apr. 6, 2012  (FR) ..................... 12 53237

(51) Int. Cl.
| *E04B 1/76* | (2006.01) |
| *C04B 28/02* | (2006.01) |
| *C04B 28/04* | (2006.01) |
| *C04B 38/10* | (2006.01) |
| *C04B 28/06* | (2006.01) |
| *C04B 28/14* | (2006.01) |
| *C04B 11/00* | (2006.01) |
| *C04B 111/40* | (2006.01) |

(52) U.S. Cl.
CPC .............. *E04B 1/76* (2013.01); *C04B 11/005* (2013.01); *C04B 28/02* (2013.01); *C04B 28/04* (2013.01); *C04B 28/065* (2013.01); *C04B 28/14* (2013.01); *C04B 38/10* (2013.01); *C04B 2111/40* (2013.01); *Y02W 30/92* (2015.05); *Y02W 30/94* (2015.05)

(58) Field of Classification Search
CPC ......... C04B 38/10; C04B 28/02; C04B 28/04; C04B 28/065; C04B 28/14; C04B 11/005; C04B 14/06; C04B 14/064; C04B 14/22; C04B 14/24; C04B 14/28; C04B 14/365; C04B 18/08; C04B 18/141; C04B 18/146; C04B 22/147; C04B 40/0028; C04B 7/02; C04B 7/32; C04B 20/008; C04B 2111/40; C04B 2103/10; C04B 2103/22; C04B 2103/30; C04B 2103/302; C04B 2103/32; C04B 2103/40; C04B 2103/44; C04B 2103/0008; E04B 1/76

See application file for complete search history.

(56) References Cited

U.S. PATENT DOCUMENTS

| 5,709,743 A | 1/1998 | Leture et al. |
| 6,046,255 A * | 4/2000 | Gray et al. ................. 523/218 |
| 6,153,005 A * | 11/2000 | Welker ............... C04B 24/2682 |
| | | 106/677 |
| 2012/0286190 A1* | 11/2012 | Prat ........................ C04B 28/06 |
| | | 252/62 |

FOREIGN PATENT DOCUMENTS

| CN | 102060566 | 5/2011 | |
| EP | 2 105 419 | 9/2009 | |
| EP | 2172319 A1 * | 4/2010 | ............ B28C 5/386 |
| EP | 2 364 962 | 9/2011 | |
| FR | 2 708 592 | 2/1995 | |
| FR | 2 941 450 | 7/2010 | |
| JP | H 069255 A * | 3/2002 | ............ C04B 18/18 |
| WO | WO 98/57906 | 12/1998 | |
| WO | WO 2006/018569 | 2/2006 | |
| WO | WO 2010/070214 | 6/2010 | |
| WO | WO 2011/086333 | 7/2011 | |

OTHER PUBLICATIONS

International Preliminary Report on Patentability issued in International Patent Application No. PCT/EP2013/057238, dated Oct. 16, 2014.
International Search Report issued for International Application No. PCT/EP2013/057238, dated May 2, 2013.

* cited by examiner

*Primary Examiner* — Anthony J Green
(74) *Attorney, Agent, or Firm* — Pillsbury Winthrop Shaw Pittman LLP

(57) ABSTRACT

A process for producing a mineral foam includes (i) separately preparing one or more slurries of cement, and an aqueous foam for which a D50 of bubbles is less than or equal to 400 μm; (ii) homogenizing the one or more slurries of cement with the aqueous foam to obtain a slurry of foamed cement; (iii) casting the slurry of foamed cement and leaving the cast slurry of foamed cement to set.

17 Claims, No Drawings

INSULATING MINERAL FOAM

CROSS-REFERENCE TO RELATED APPLICATIONS

This is the U.S. National Stage of PCT/EP2013/057238, filed Apr. 5, 2013, which in turn claims priority to French Patent Application No. 1253237, filed Apr. 6, 2012, the entire contents of these applications are incorporated herein by reference in their entireties.

The present invention relates to a process for production of insulating mineral foams with a base of cement, to the mineral foams thus obtained and to elements of construction comprising these foams.

Generally, mineral foam is very advantageous for many applications due to its thermal insulation properties. Mineral foam is a material in the form of foam. This material is generally more lightweight than typical concrete due to its pores or empty spaces. It is also known as cement foam. These pores or empty spaces are due to the presence of air in the mineral foam and they may be in the form of bubbles. With 1 $m^3$ of raw material it is possible to produce approximately 5 $m^3$ of a finished product, that is, a material wherein 20% is material and 80% is air (this is valid for an element with a density of approximately 400 $kg/m^3$).

When mineral foam is poured into an element of considerable height, the mineral foam may slump due to a lack of stability in the mineral foam during the setting. These slump problems of the foam may be due to coalescence phenomena, to Ostwald ripening phenomena or to draining phenomena, the latter being greater, in particular due to the force of weight.

The difficulty in the production of mineral foams is therefore to produce stable mineral foam which reduces these slump problems. However, known processes are not capable of providing sufficiently stable mineral foams.

In order to meet users requirements, it has become necessary to find a new means to produce highly stable mineral foam, which is to say which keeps its stability whatever the given height.

Therefore, the problem which the invention intends to solve is to find a process for production of stable mineral foam, which does not slump, or only slightly, when the foam is poured vertically.

The invention relates to a process for production of a mineral foam having a density of 100 to 600 $kg/m^3$, produced from a slurry of foamed cement as well as the mineral foam obtained by this process.

According to another feature of the invention, the mineral foam according to the invention may be used as construction material or insulating material. For example, the mineral foam may be poured between two panels of gypsum boards, or between two brick walls or between two load-bearing concrete walls.

The invention also relates to elements of construction comprising a mineral foam according to the invention.

The present invention intends to provide a new process having one or more of the following characteristics:
- the process is universal, which is to say it makes it possible to produce a stable mineral foam from any type of cement;
- the process is easy to implement;
- the process can be easily transported to any site or jobsite;
- the process makes it possible to implement a mineral foam in a continuous manner. It is therefore possible to produce the mineral foam continuously and to pour this foam without interruption.

The present invention also intends to provide new mineral foams which have one or more of the following characteristics:
- the mineral foam according to the invention has excellent stability properties. In particular, it is possible to obtain foam that does not slump or only very slightly when the foam is poured vertically or from a considerable height. For example, the mineral foam according to the invention does not slump or only very slightly when it is poured vertically from a height greater than or equal to 2 meters;
- the mineral foam according to the invention has excellent thermal properties, and in particular very low thermal conductivity. It is highly desirable to reduce thermal conductivity in construction materials since this makes it possible to obtain savings of heating energy for residence and office buildings. Furthermore, this decrease makes it possible to reduce thermal bridges, in particular in the construction of buildings several stories high and designed using indoor thermal insulation, in particular thermal bridges are reduced on the intermediary floors.

Process:

The invention relates to a process for production of a mineral foam comprising the following steps:
(i) separately prepare one or more slurries of cement and an aqueous foam for which the D50 of the bubbles is less than or equal to 400 µm;
(ii) homogenize this or these slurries of cement with the aqueous foam to obtain a slurry of foamed cement;
(iii) cast the slurry of foamed cement and leave it to set.

The process for production of a mineral foam according to the invention may be used in a discontinuous or continuous system.

In step (i), the slurry or slurries may be prepared using mixers typically used to produce cement slurries. They may be a mixer for slurries, a mixer from a cement batching plant, a mixer described in the European NF EN 196-1 Standard of April 2006-Paragraph 4.4, or a beater with a planetary movement.

The slurry or slurries may be prepared by introducing into the mixer the various powder materials. The powders are mixed to obtain a homogenous mixture. Then, the water is introduced into the mixer. Then, the mineral particles, the admixtures, for example the water-reducer, the plasticizer, the superplasticizer or the retarder are introduced when they are present in the formulation of the mineral foam. The obtained paste is mixed to obtain a cement slurry or a mix of cement slurries.

Preferably, when calcium sulphate is present during the preparation of the cement slurry, it is introduced before or after the addition of water. In particular, the calcium sulphate is not introduced during the preparation of a slurry of calcium aluminate cement.

Preferably, the slurry or slurries are stirred using a deflocculating blade throughout the duration of the process for production of the mineral foam according to the invention.

The cement slurries may be generated continuously in the process according to the invention.

The water/total cement ratio of the slurry of foamed cement used to produce the mineral foam according to the invention is preferably from 0.25 to 0.5, more preferably from 0.3 to 0.45. This water/total cement ratio may vary, for example due to the water demand of the mineral particles when these are used. This water/total cement ratio is defined as being the ratio by mass of the quantity of water (W) to the mass of all the cements (C).

In step (i), the aqueous foam may be produced by combining water and a foaming agent, then introducing a gas. This gas is preferably air.

The introduction of air may be carried out by stirring, by bubbling or by injection under pressure.

Preferably, the aqueous foam may be produced using a turbulent foamer (bed of glass beads for example). This type of foamer makes it possible to introduce air under pressure into an aqueous solution comprising a foaming agent.

The aqueous foam may be generated continuously in the process according to the invention.

The generated aqueous foam has air bubbles with a D50 which is less than or equal to 400 µm, preferably comprised from 100 to 400 µm, more preferably comprised from 150 to 300 µm.

Preferably, the generated aqueous foam has air bubbles with a D50 which is 250 µm.

The D50 of the bubbles is measured by back scattering. The apparatus used is the Turbiscan® Online provided by the Formulaction company. Measurements of the back scattering make it possible to estimate a D50 for the bubbles of an aqueous foam, by knowing beforehand the volume fraction of the bubbles and the refractive index of the solution of foaming agent.

In step (ii), the slurry or slurries of cement may be homogenized with the aqueous foam by any means to obtain a slurry of foamed cement.

Preferably, step (ii) of the process according to the invention may comprise the introduction of the slurry or slurries of cement and the aqueous foam into a static mixer to obtain a slurry of foamed cement.

The suitable static mixers according to the invention preferably have elements in the form of a propeller to ensure complete radial mixing and successive divisions of the flow for each combination of liquids and gas. The suitable static mixers according to the invention preferably have helical elements which transmit a radial speed to the fluid, which is directed alternatively towards the side of the mixer, then towards its centre. The successive combinations of elements directing the flow clockwise and counter clockwise provoke a change of direction and a division of the flow. These two combined actions increase the efficiency of the mixing. Preferably, the static mixer used in the process according to the invention is a mixer operating by dividing the continuous flow of cement slurry and of aqueous foam. The homogeneity of the mix is based on the number of divisions. According to the process of the invention, 16 elements are preferably used to ensure good homogeneity. The suitable static mixers according to the process of the invention are preferably those commercialised under the brand name of Kenics®.

According to a more particular embodiment, the cement slurry is pumped at a precise volume flow which is a function of the target composition of foamed cement slurry. Then, this cement slurry is combined with the aqueous foam already circulating in the circuit of the process. The slurry of foamed cement according to the invention is thus generated. This slurry of foamed cement is cast and left to set.

According to variant 1, step (i) of the process for production according to the invention may comprise the preparation of two slurries of cement, one of which is a slurry of calcium aluminate cement.

According to this variant 1, the process for production according to the invention may comprise the following steps:
separately prepare a slurry of cement, a slurry of calcium aluminate cement and an aqueous foam;
combine the slurry of cement with the slurry of calcium aluminate cement to obtain a third slurry of cement;
homogenize this third slurry of cement with the aqueous foam to obtain a slurry of foamed cement;
cast the slurry of foamed cement and leave it to set.

According to a particular case of variant 1, the cement slurry may be first combined with the aqueous foam to form a foamed mixture. Then this foamed mixture is combined with the slurry of calcium aluminate cement using a mixer, to obtain a slurry of foamed cement according to the invention. This slurry of foamed cement is cast and left until it sets. The mixer used to combine the foamed mixture and the slurry of calcium aluminate cement is preferably a static mixer.

Advantageously, the process according to the invention does not require an autoclave step, or a curing step, or a step of thermal treatment, for example thermal treatment at 60-80° C. in order to obtain a mineral foam according to the invention.

Mineral Foams According to the Invention

The present invention then relates to a mineral foam obtainable according to the process of the invention.

The mineral foam according to the invention can have a density of 100 to 600 kg/m$^3$.

Preferably, the mineral foam according to the invention has a density of 100 to 550 kg 1 m$^3$, more preferably from 150 to 450 kg 1 m$^3$, most preferably from 150 to 300 kg 1 m$^3$. It is to be noted that the density of the slurry of foamed cement (humid density) is different to the density of the mineral foam (density of the hardened material).

The invention provides the advantage that the mineral foam according to the invention is very lightweight, and in particular has a very low density.

The invention provides another advantage in that the mineral foam according to the invention has excellent stability properties. In particular, it is possible to obtain a foam which does not slump or only very slightly when the foam is poured from a height of at least one meter for a section of 30 cm$^2$, and for which the distribution of the density in the material varies by at most 11%, preferably by at most 5%, more preferably by at most 2%.

The invention provides another advantage in that the mineral foam according to the invention has excellent thermal properties, and in particular very low thermal conductivity. Thermal conductivity (also called lambda ($\lambda$)) is a physical value characterizing the behaviour of materials during the transfer of heat by conduction. Thermal conductivity represents the quantity of heat transferred per unit of surface and per unit of time submitted to a gradient of temperature. In the international system of units, thermal conductivity is expressed in watts per meter Kelvin, (W·m$^{-1}$·K$^{-1}$). Typical or conventional concretes have thermal conductivity values measured at 23° C. and 50% relative humidity of 1.3 to 2.1. The thermal conductivity of the mineral foam according to the invention is from 0.05 to 0.5 W/m·K, preferably from 0.08 to 0.3 W/m·K, more preferably from 0.08 to 0.2 W/m·K, most preferably from 0.08 to 0.18 W/m·K.

The invention provides another advantage in that the mineral foam according to the invention has good mechanical properties, and in particular good compressive strength compared to known mineral foams. The compressive strength of the mineral foam according to the invention is from 0.1 to 10 MPa, preferably from 0.1 to 8 MPa, more preferably from 0.2 to 4 MPa.

Variant 1 of the Mineral Foam According to the Invention

According to a first variant, the mineral foam according to the invention may be produced from a slurry of foamed cement comprising at least, in % by mass relative to the mass of slurry of foamed cement:
- from 20 to 70% of cement;
- from 1 to 5% of calcium sulphate;
- from 0.5 to 10% of calcium aluminate cement;
- from 0.05 to 3% of a water reducer, a plasticizer or a superplasticizer;
- from 0.001 to 0.5% of a retarder;
- from 0.1 to 5% of a foaming agent;
- from 15 to 40% of water;

the calcium aluminate cement/calcium sulphate ratio, expressed in mass percentage being from 0.5 to 2.5;

the calcium sulphate/cement ratio, expressed in mass percentage being from 0.03 à 0.09.

The suitable cement for the slurry of foamed cement required to produce the mineral foam according to the invention is preferably the cements described according to the European NF EN 197-1 Standard of February 2001 or mixtures thereof. The preferred cement, used according to the invention is the Portland CEM I cement, by itself or mixed with other cements, for example those described according to the European NF EN 197-1 Standard of February 2001.

Preferably, the slurry of foamed cement used to produce the mineral foam according to the invention comprises 30 to 55% of cement, preferably 30 to 51%, in % by mass relative to the mass of slurry of foamed cement.

The slurry of foamed cement used to produce the mineral foam according to the invention may comprise calcium sulphate. Calcium sulphate used according to the present invention includes gypsum (calcium sulphate dihydrate, $CaSO_4.2H_2O$), hemi-hydrate ($CaSO_4.\frac{1}{2}H_2O$), anhydrite (anhydrous calcium sulphate, $CaSO_4$) or a mixture thereof. The gypsum and anhydrite exist in the natural state. Calcium sulphate produced as a by-product of certain industrial processes may also be used.

The suitable calcium aluminate cement for the slurry of foamed cement used to produce the mineral foam according to the invention is generally a cement comprising a $C_4A_3\$$, CA, $C_{12}A_7$, $C_3A$ or $C_{11}A_7CaF_2$ mineralogical phase or mixtures thereof, for example Fondu® cements, sulfoaluminous cements, calcium aluminate cements conforming with the NF EN 14647 Standard of December 2006, the cement obtained from the clinker described in patent application WO 2006/018569 or mixtures thereof. The suitable calcium aluminate cement for the slurry of foamed cement used to produce the mineral foam according to the invention may be in a crystallised form or in an amorphous form.

The preferred calcium aluminate cement according to the invention is the Fondu® cement.

Preferably, the slurry of foamed cement used to produce the mineral foam according to the invention comprises 0.5 to 7% of calcium aluminate cement, preferably 1 to 5%, in % by mass relative to the mass of slurry of foamed cement.

Preferably, the calcium aluminate cement/calcium sulphate ratio, expressed in mass percentage, determined for the slurry of foamed cement to produce the mineral foam according to the invention is from 0.6 to 2.2, more preferably from 0.8 to 2.

Preferably, the calcium sulphate/cement ratio, expressed in mass percentage, determined for the slurry of foamed cement to produce the mineral foam according to the invention is from 0.04 to 0.08, more preferably from 0.05 to 0.07.

The slurry of foamed cement used to produce the mineral foam according to the invention comprises a water reducer, a plasticizer or a superplasticizer. A water reducer makes it possible to reduce the amount of mixing water for a given workability by typically 10-15%. By way of example of water reducers, mention may be made of lignosulphonates, hydroxycarboxylic acids, carbohydrates, and other specific organic compounds, for example glycerol, polyvinyl alcohol, sodium alumino-methyl-siliconate, sulfanilic acid and casein as described in the Concrete Admixtures Handbook, Properties Science and Technology, V. S. Ramachandran, Noyes Publications, 1984.

Superplasticizers belong to a new class of water reducers and are capable of reducing water contents of mixing water, for a given workability, by approximately 30% by mass. By way of example of a superplasticizer, the PCP superplasticizers without an anti-foaming agent may be noted. The term "PCP" or "polyoxy polycarboxylate" is to be understood according to the present invention as a copolymer of acrylic acids or methacrylic acids and their esters of polyoxy ethylene (POE). It is also possible to mention the dispersing agents with differed efficiency.

Preferably, the slurry of foamed cement used to produce the mineral foam according to the invention comprises 0.05 to 1%, more preferably 0.05 to 0.5% of a water reducer, a plasticizer or a superplasticizer, percentage expressed by mass relative to the mass of slurry of foamed cement.

When the water reducer, the plasticizer or the superplasticizer is used in solution, the quantity is given as active material in the solution.

According to a variant of the invention, the slurry of foamed cement used to produce the mineral foam according to the invention does not comprise an anti-foaming agent, or any agent having the property of destabilizing an air/liquid emulsion. Certain commercial superplasticizers may contain anti-foaming agents and consequently these superplasticizers are not suitable for the slurry of foamed cement used to produce the mineral foam according to the invention.

The slurry of foamed cement used to produce the mineral foam according to the invention comprises a retarder. The retarder corresponds to the definition of the retarder mentioned in the European NF EN 934-2 Standard of September 2002.

The retarder used according to the invention may be selected from:
- sugars and derivative products, in particular, saccharose, glucose, sugar reducers (for example, lactose or maltose), cellobiose, gallactose or derivative products, for example, glucolactone;
- carboxylic acids or salts thereof, in particular gluconic acid, gluconate, tartric acid, citric acid, gallic acid, glucoheptonic acid, saccharic acid or salicylic acid. The associated salts comprise, for example, ammonium salt, alkali metal salt (for example sodium salt or potassium salt), alkali earth metal salt (for example calcium salt or magnesium salt). However, other salts may also be used;
- phosphonic acids and salts thereof, in particular aminotri (methylenephosphonic) acid, pentasodic salt of aminotri(methylenephosphonic) acid, hexamethylene-diamine-tetra(methylene-phosphonic) acid, diethylene-triamine-penta(methylene-phosphonic acid and its sodium salt);
- phosphates and their derivatives;
- zinc salts, in particular zinc oxide, zinc borate and soluble zinc salts (nitrate, chloride);

borates, in particular boric acid, zinc borate and boron salts;

mixtures of these compounds.

Preferably, the retarder is a carboxylic acid or a salt of carboxylic acid. According to an embodiment of the invention, the retarder is a citric acid or a salt thereof.

According to an embodiment of the invention, the retarder used in the slurry of foamed cement according to the invention is a mixture of carboxylic acid and phosphonic acid or a mixture of salts thereof.

Preferably, the slurry of foamed cement used to produce the mineral foam according to the invention comprises 0.005 to 0.2% of retarder, more preferably 0.01 to 0.1%, in % by mass relative to the mass of slurry of foamed cement.

The slurry of foamed cement used to produce the mineral foam according to the invention comprises a foaming agent. The foaming agent is generally a compound which modifies the superficial tension between two surfaces, in particular which lowers the superficial tension at the interface between a liquid and a gas, between a liquid and a solid or between two liquids. This compound is also called a surfactant.

The foaming agent used according to the invention may be selected from ionic, non-ionic, amphiphilic or amphoteric foaming agents and used alone or in mixtures.

By way of ionic surfactants, the following non-limiting examples may be mentioned: alkylethersulfonates, hydroxyalkylethersulfonates, alphaolefinesulfonates, the alkylbenzenesulfonates, alkylester sulfonates, alkylethersulfates, hydroxyalkylethersulfates, alphaolefinesulfates, alkylbenzenesulfates, alkylamide sulfates, as well as their alkoxylated derivatives (in particular ethoxylated derivatives (EO) and/or propoxylated derivatives (PO)), or mixtures thereof.

By way of ionic surfactants, the following non-limiting examples may also be mentioned: the saturated or insaturated fatty acid salts and/or their alkoxylated derivatives, in particular (EO) and/or (PO) (for example lauric acid, palmitic acid or stearic acid), alkylglycerol sulfonates, sulfonated polycarboxylic acids, paraffin sulfonates, N-alkyl N-alkyltaurates, alkylphosphates, alkylsuccinamates, alkylsulfosuccinates, monoesters or diesters of sulfosuccinates, sulfates of alkylglucosides, for example those in acid or lactone form and derivatives of 117-hydroxyoctadecenic acid.

By way of non-ionic surfactants, the following non-limiting examples may be mentioned: ethoxylated fatty acids, alkoxylated alkylphenols (in particular (EO) and/or (PO)), aliphatic alcohols, more particularly in C8-C22, products resulting from the condensation of ethylene oxide or propylene oxide with propylene glycol or ethylene glycol, products resulting from the condensation of ethylene oxide or propylene oxide with ethylene diamine, amides of alkoxylated fatty acids (in particular (EO) and/or (PO)), alkoxylated amines (in particular (EO) and/or (PO)), alkoxylated amidoamines (in particular (EO) and/or (PO)), amine oxides, alkoxylated terpenic hydrocarbons (in particular (EO) and/or (PO)), alkylpolyglucosides, polymers or amphiphilic oligomers, ethoxylated alcohols, esters of sorbitan or esters of oxyethylated sorbitan.

By way of amphoteric surfactants, the following non-limiting examples may be mentioned: betaines, derivatives of imidazoline, polypeptides or lipoaminoacides. More particularly, suitable betaines according to the invention may be selected from cocamidopropyl betaine, dodecylic betaine, hexadecylic betaine and octadecylic betaine.

According to a particular embodiment of the invention, the non-ionic foaming agent may be associated to at least one anionic foaming agent.

By way of amphiphilic surfactants, the following non-limiting examples may be mentioned: polymers, oligomers or copolymers which are at least miscible in the aqueous phase.

The amphiphilic polymers or oligomers may have a statistic distribution or a multi-block distribution.

The amphiphilic polymers or oligomers used according to the invention are selected from block polymers comprising at least one hydrophilic block and at least one hydrophobic block, the hydrophilic block being obtained from at least one non-ionic and/or anionic monomer.

By way of example, the following amphiphilic polymers or oligomers may be mentioned: polysaccharides having hydrophobic groups, in particular alkyl groups, polyethylene glycol and its derivatives.

By way of example, the following amphiphilic polymers or oligomers may also be mentioned: three-block polyhydroxystearate polymers-polyethylene glycol-polyhydroxystearate or hydrophobic polyacrylamides.

Non-ionic amphiphilic polymers, and more particularly alkoxylated polymers (in particular (EO) and/or (PO)), are more preferably selected from polymers of which at least one part (at least 50% by weight) is miscible in water.

By way of examples of this type of polymer, the following polymers may be mentioned among others: three-block polyethylene glycol/polypropylene glycol/polyethylene glycol polymer.

Preferably, the foaming agent used according to the invention is a protein, in particular a protein of animal origin, more particularly keratin.

Preferably, the foaming agent used according to the invention is a protein with a molecular weight of 1000 to 50 000 Daltons.

The preferred surfactants used according to the invention are the non-ionic and the anionic surfactants.

Preferably, the foaming agent is used according to the invention at a concentration of 0.15 to 1%, more preferably from 0.20 to 0.85%, by mass of foaming agent relative to the mass of slurry of foamed cement. Even more preferably, the slurry of foamed cement comprises at least 0.1% of foaming agent relative to the mass of slurry of foamed cement. Most preferably, the slurry of foamed cement comprises at least 0.3% of foaming agent relative to the mass of slurry of foamed cement.

According to an embodiment of the invention, the slurry of foamed cement used to produce the mineral foam according to the invention may further comprise mineral particles.

Preferably, the slurry of foamed cement used to produce the mineral foam according to the invention may comprise 15 to 50% of mineral particles, more preferably from 15 to 40%, most preferably from 20 to 35%, the percentages being expressed by mass relative to the mass of slurry of foamed cement.

The suitable mineral particles for the slurry of foamed cement used to produce the mineral foam according to the invention are selected from calcium carbonate, silica, ground glass, solid or hollow glass beads, glass granules, expanded glass powders, silica aerogels, silica fume, slags, ground sedimentary siliceous sands, fly ash or pozzolanic materials or mixtures thereof.

The mineral particles used according to the invention may be pozzolanic materials (for example as defined in the European NF EN 197-1 Standard of February 2001, paragraph 5.2.3), silica fume (for example, as defined in the European NF EN 197-1 Standard of February 2001, paragraph 5.2.7), slags (for example, as defined in the European NF EN 197-1 Standard of February 2001, paragraph 5.2.2), material containing calcium carbonate, for example limestone (for example, as defined in the European NF EN 197-1 Standard paragraph 5.2.6), siliceous additions (for example, as defined in the "Concrete" NF P 18-509 Standard), fly ash (for example, as described in the European NF EN 197-1 Standard of February 2001, paragraph 5.2.4) or mixtures thereof.

Fly ash is generally pulverulent particles comprised in fume from thermal power plants which are fed with coal. Fly ash is generally recovered by electrostatic or mechanical precipitation.

The chemical composition of a fly ash mainly depends on the chemical composition of the unburned carbon and on the process used in the thermal power plant where it came from. Its mineralogical composition also depends on the same factors. The fly ash used according to the invention may have a siliceous or calcic nature.

Slags are generally obtained by rapid cooling of molten slag resulting from melting of iron ore in a blast furnace.

The slags used according to the present invention may be selected from granulated blast-furnace slags according to the EN 197-1 Standard of February 2001, paragraph 5.2.2.

Silica fume used according to the present invention may be a material obtained by the reduction of very high quality quartz by the coal in electric arc furnaces used for the production of silicon and alloys of ferrosilicon. Silica fume is generally formed of spherical particles comprising at least 85% by mass of amorphous silica.

Preferably, the silica fume used according to the present invention may be selected from silica fume according to the European NF EN 197-1 Standard of February 2001, paragraph 5.2.7.

The pozzolanic materials used according to the present invention may be natural siliceous and/or silico-aluminous materials or a combination thereof. Among the pozzolanic materials, natural pozzolans can be mentioned, which are generally materials of volcanic origin or sedimentary rocks, and natural calcined pozzolans, which are materials of volcanic origin, clays, shale or thermally-activated sedimentary rocks.

Preferably, the pozzolanic materials used according to the present invention may be selected from the pozzolanic materials according to the European NF EN 197-1 Standard of February 2001 paragraph 5.2.3.

Preferably, the mineral particles used according to the invention may be limestone powders and/or slags and/or fly ash and/or silica fume. Preferably, the mineral particles used according to the invention are limestone powders and/or slags.

Other suitable mineral particles for the slurry of foamed cement used to produce the mineral foam according to the invention are calcareous, siliceous or silico-calcareous powders or mixtures thereof.

The suitable mineral particles for the slurry of foamed cement used to produce the mineral foam according to the invention may come partially or in totality from the cement when it is a blended cement.

Preferably, the average size of the suitable mineral particles for the slurry of foamed cement used to produce the mineral foam according to the invention is from 0.1 to 500 μm, for example from 0.1 to 250 μm. The $D_{50}$ of the mineral particles is preferably from 0.1 to 150 μm, more preferably from 0.1 to 100 μm.

According to an embodiment of the mineral foam according to the invention, the slurry of foamed cement used to produce the mineral foam according to the invention may further comprise a thickening agent.

The expression <<thickening agent>>, is generally to be understood according to the present invention as any compound making it possible to maintain the heterogeneous physical phases in equilibrium or facilitate this equilibrium.

The suitable thickening agents according to the invention are preferably gums, cellulose or its derivatives, for example cellulose ethers or carboxy methyl cellulose, starch or its derivatives, gelatine, agar, carrageenans or bentonite clays.

The suitable gums according to the invention, used as a thickening agent are preferably selected from Acacia, Tragacanth, Carob, Dextran, Diutan, Gellan, Guar, Scleroglucane, Xanthan, Welan gums. The expression <<gum>>, is generally to be understood according to the invention as vegetable exudates or extracellular secretions with a microbiological origin.

Preferably, the slurry of foamed cement used to produce the mineral foam of variant 1 according to the invention does not comprise lightweight aggregates as described in the European NF EN 206-1 Standard of April 2004, for example, perlite. It does not either comprise lightweight charges, for example polystyrene beads.

Preferably, the slurry of foamed cement used to produce the mineral foam according to the invention comprises 20 to 35% of water, % by mass relative to the mass of foamed cement slurry.

Other additives may also be used in the slurry of foamed cement used to produce the mineral foam according to the invention, for example coloured pigments, hydrophobic agents or de-polluting agents (for example zeolites or titanium dioxide).

Variant 2 of the Mineral Foam According to the Invention

According to a second variant of the invention, the mineral foam according to the invention may be produced from a slurry of foamed cement comprising at least, in % by mass relative to the mass of the slurry of foamed cement from 30 to 75% of cement;
from 10 to 70% of fine mineral particles with a D50 less than or equal to 5 μm;
from 0 to 15% of ultrafine mineral particles with a D50 less than or equal to 1 μm;
from 0.05 to 3% of a water reducer, a plasticizer or a superplasticizer;
from 0.0001 to 1% of a retarder;
from 0 to 0.1% of a thickening agent;
de 0.01 to 5% of a foaming agent;
from 0 to 0.5% of alkaline sulphates;
from 0 to 1% of an accelerator;
from 10 to 70% of water;
the fine mineral particles/cement ratio, expressed in mass percentage being comprised from 0.27 to 0.6;
the ultrafine mineral particles/fine mineral particles ratio, expressed in mass percentage being comprised from 0 to 0.5.

The suitable cement for the slurry of foamed cement used to produce the mineral foam according to the invention is preferably the cements described according to the European NF EN 197-1 Standard of February 2001 or mixtures thereof. The preferred and suitable cement according to the invention is the Portland CEM I cement, by itself or mixed with other cements, for example those described according to the European NF EN 197-1 Standard of February 2001. The CEM III cement is also suitable.

Preferably, the slurry of foamed cement used to produce the mineral foam according to the invention comprises 35 to 60% of cement, more preferably 40 to 60%.

The suitable fine mineral particles with a D50 less than or equal to 5 μm according to the invention may come from one or more materials selected from fly ash, pozzolans (natural and artificial), limestone powders, siliceous powders, lime, calcium sulphate (in particular gypsum in the anhydrous or hemi hydrate forms) and slags.

The D50, also noted as $D_v50$, corresponds to the $50^{th}$ percentile of the size distribution of the particles, by volume; that is, 50% of the particles have a size that is less than or equal to D50 and 50% of the particles have a size that is greater than D50.

The D50 of the fine particles according to the invention is less than or equal to 5 μm, preferably comprised from 1 to 4 μm, more preferably comprised from 1.5 to 3 μm.

Preferably, the slurry of foamed cement used to produce the mineral foam according to the invention comprises 15 to 60% of fine mineral particles, more preferably 15 to 40%, % by mass relative to the mass of foamed cement slurry.

Preferably, the slurry of foamed cement used to produce the mineral foam according to the invention comprises 0 to 8% of ultrafine mineral particles, preferably 2 to 6%, % by mass relative to the mass of foamed cement slurry.

The suitable ultrafine mineral particles having a D50 less than 1 μm used according to the invention may come from one or more materials selected from limestone powders, precipitated calcium carbonates, natural and artificial pozzolans, pumice stones, ground fly ash, crushed material of a hydrated or carbonated silica hydraulic binder and mixtures or co-grindings thereof in the dry form. The term <<crushed material of a hydrated silica hydraulic binder>> denotes, in particular the products described in the FR 2708592 document.

The D50 of the ultrafine mineral particles used according to the invention is less than or equal to 1 μm, preferably comprised from 10 to 500 nm, more preferably comprised from 50 to 200 nm.

Preferably, the slurry of foamed cement used to produce the mineral foam according to the invention comprises 0.001 to 0.5% or a retarder, % by mass relative to the mass of foamed cement slurry. The description provided herein above for the selection of the retarder applies to this variant of the mineral foam according to the invention.

Preferably, the slurry of foamed cement used to produce the mineral foam according to the invention comprises 0.001 to 0.01% of a thickening agent, % by mass relative to the mass of foamed cement slurry. The description provided herein above for the selection of the thickening agent applies to this variant of the mineral foam according to the invention.

Preferably, the slurry of foamed cement used to produce the mineral foam according to the invention comprises 0.03 to 1% of a foaming agent, % by mass relative to the mass of foamed cement slurry. The description provided herein above for the selection of the foaming agent applies to this variant of the mineral foam according to the invention.

Preferably, the slurry of foamed cement used to produce the mineral foam according to the invention comprises 0.05 to 0.8% of an accelerator, % by mass relative to the mass of foamed cement slurry.

The suitable accelerator according to the invention may come from one or more salts selected from:
  calcium salts, potassium salts and sodium salts wherein the anion may be nitrate, nitrite, chloride, formiate, thiocyanate, sulphate, bromide, carbonate or mixtures thereof;
  alkali silicates and aluminates, for example sodium silicate, potassium silicate, sodium aluminate, potassium aluminate or mixtures thereof;
  aluminium salts, for example aluminium sulphate, aluminium nitrate, aluminium chloride, aluminium hydroxide or mixtures thereof;
or mixtures thereof.

Preferably, the slurry of foamed cement used to produce the mineral foam according to the invention comprises 15 to 40% of water, % by mass relative to the mass of foamed cement slurry.

The description provided herein above for the selection of the water reducer, the plasticizer or the superplasticizer applies to this variant of the mineral foam according to the invention.

Other additives may also be used in the slurry of foamed cement used to produce the mineral foam according to the invention, for example coloured pigments, hydrophobic agents or de-polluting agents (for example zeolites or titanium dioxide).

Variant 3 of the Mineral Foam According to the Invention

According to a third variant of the invention, the mineral foam according to the invention may be produced from a slurry of foamed cement comprising at least, in % by mass relative to the mass of foamed cement slurry
  from 30 to 75% of cement obtained from clinker comprising at least one mineralogical $C_4A_3\$$ phase;
  from 0.05 to 3% of a water reducer, a plasticizer or a superplasticizer;
  from 0 to 0.1% of a thickening agent;
  from 0.01 to 5% of a foaming agent;
  from 0.00001 to 0.01% of lithium salt;
  from 10 to 70% of water.

The slurry of foamed cement used to produce the mineral foam according to the invention may comprise calcium sulphate.

Calcium sulphate used according to the present invention includes gypsum (calcium sulphate dihydrate, $CaSO_4.2H_2O$), hemi-hydrate ($CaSO_4.\frac{1}{2}H_2O$), anhydrite (anhydrous calcium sulphate, $CaSO_4$) or a mixture thereof. The gypsum and anhydrite exist in the natural state. Calcium sulphate produced as a by-product of certain industrial processes may also be used.

The slurry of foamed cement used to produce the mineral foam according to the invention may comprise a lithium salt selected from lithium carbonate, lithium hydroxide, lithium chloride, lithium nitrate, lithium sulphate, lithium fluoride and lithium citrate.

The slurry of foamed cement used to produce the mineral foam according to the invention comprises a cement obtained from clinker comprising at least one mineralogical C4A3$ phase. It may be a cement produced from the clinker described in patent application WO 2006/018569 or cement obtained from clinker comprising at least one C4A3$ mineralogical phase, and optionally one $C_2S$, $C_3S$, $C_{12}A_7$, $C_3A$, $Ca_5(SiO4)_2SO_4$ phase or $C_{11}A_7CaF_2$ mineralogical phase or mixtures thereof.

The description provided herein above for the selection of the water reducer, the plasticizer or the superplasticizer, the thickening agent and the foaming agent applies to this variant of the mineral foam according to the invention.

Other additives may also be used in the slurry of foamed cement used to produce the mineral foam according to the invention, for example coloured pigments, hydrophobic agents or de-polluting agents (for example zeolites or titanium dioxide).

Use:

The mineral foam according to the invention may be a concrete, which is pre-cast on the jobsite, a ready-mix concrete or a concrete produced at a production plant of pre-cast elements. Preferably, the mineral foam according to the invention is a ready-mix concrete.

The mineral foam according to the invention may also be directly prepared on the jobsite by installing a foaming system on the jobsite.

The invention also relates to the use of the mineral foam according to the invention as construction material.

The mineral foam according to the invention may be used to cast walls during a jobsite.

The mineral foam according to the invention may be used for mortar beds. The mortar bed is a coating layer making it possible to coat service ducts on a structural floor before laying a heating floor and before casting a screed. The use of the mineral foam according to the invention as a layer of mortar bed makes it possible to coat service ducts in one single step and thermally insulate the heating floor of the slab. This process according to the invention makes it possible to eliminate the step of laying the insulating layer added between the mortar bed and the heating floor.

The invention also relates to the use of the mineral foam according to the invention as insulating material.

Advantageously, the mineral foam according to the invention makes it possible in certain cases to replace glass wool, mineral wool or polystyrene insulating material.

Advantageously, the mineral foam according to the invention may be used to fill in empty or hollow spaces in a building, a wall, a partition wall, a floor or a ceiling. In this case, it is used as a filling compound.

Advantageously, the mineral foam according to the invention may be used as facade lining to insulate a building from the outside. In this case, the mineral foam according to the invention may be coated by a finishing compound.

The invention also relates to a system comprising the mineral foam according to the invention. The mineral foam may be present in the system, for example as insulating material. The system according to the invention is a system capable of resisting to transfers of air and to thermohydric transfers, which is to say that this element has controlled permeability to transfers of air or water in the vapour or liquid form.

The system according to the invention, which resists to transfers of air and to thermohydric transfers in the construction field, comprises at least a framework. This framework may be secondary or primary. This framework may be of metal, cement fibres, wood, composite material or a synthetic material. This framework may be a metal structure, a stud or a rail.

The system according to the invention may be used to produce a lining, an insulation system or a partition wall, for example a separation partition wall, a distribution partition wall or an inner partition.

The mineral foam according to the invention may be cast vertically between two walls, for example between two concrete walls or two plaster boards, to obtain a system.

The invention also relates to an element of construction comprising the mineral foam according to the invention.

EXAMPLES

Laser Granulometry Method

In this specification, including the accompanying claims, particle size distributions and particle sizes are as measured using a Malvern MS2000 laser granulometer. Measurement is effected in ethanol. The light source consists of a red He—Ne laser (632 nm) and a blue diode (466 nm). The optical model is that of Mie and the calculation matrix is of the polydisperse type.

The apparatus is checked before each working session by means of a standard sample (Sibelco 010 silica) for which the particle size distribution is known.

Measurements are performed with the following parameters: pump speed 2300 rpm and stirrer speed 800 rpm. The sample is introduced in order to establish an obscuration between 10 and 20%. Measurement is effected after stabilisation of the obscuration. Ultrasound at 80% is first applied for 1 minute to ensure the de-agglomeration of the sample. After about 30 s (for possible air bubbles to clear), a measurement is carried out for 15 s (15000 analysed images). Without emptying the cell, measurement is repeated at least twice to verify the stability of the result and elimination of possible bubbles.

All values given in the description and the specified ranges correspond to average values obtained with ultrasound.

Particle sizes greater than 200 µm are generally determined by sieving.

Materials:

The cement is a Portland CEM 152.5 R cement from the Lafarge cement plant of Le Havre (Batch number: LHY-4062).

The calcium sulphate is ground anhydrous calcium sulphate from the plant of Le Pin worked by Etex.

The calcium aluminate cement is a Fondu® cement from the Pyrallis company.

The plasticizer is a mixture comprising a polycarboxylate polyoxide (PCP) from the Chryso company under the brand name of Chrysolab EPB 530-017; it is based on Premia 180 which does not comprise an anti-foaming agent.

The retarder is a pure anhydrous citric acid from the Verre Labo Mule company.

The foaming agent is the Propump 26, an animal protein from the Propump company: the molecular weight of Propump 26 is 6000 Daltons.

The mineral particles are calcium carbonate supplied by OMYA under the following brand names:

Betocarb HP Entrains wherein the D50 is 7.8 µm, and having a maximum particle size of 200 µm (Batch number: ADD-0549);

Durcal 1 wherein the $D_{50}$ is 2.5 µm, and having a maximum particle size of 20 µm (Batch number: ADD-0613);

Durcal 1 wherein the $D_{50}$ is 3.5 µm, and having a maximum particle size of 20 µm (Batch number: ADD-00662);

Socal 31 wherein the $D_{50}$ is 90 nm, (Batch number: MCC-265).

The thickening agent is either a biopolymer from the CP Kelco company commercialised under the brand name of Kelco-Crete 200.

The accelerator is calcium nitrite from Chryso commercialised under the brand name of SET 02.

The LiCO3 is lithium carbonate from the Aldrich company.

Water: tap water.

Materials:

The Rayneri Mixers:

A mixer: model R 602 EV (2003) supplied by the Rayneri company. The mixer is composed of a chassis on which vessels are positioned (capacity: 10 to 60 liters). The 60-liter blade was used with a paddle type of blade adapted to the volume of the vessel. This paddle is entrained by an electric motor operating on 380 Volts at a variable speed. The blade exerts a rotation movement around itself, accompanied by a planetary movement around the axis of the vessel.

A Turbotest mixer (MEXP-101, model: Turbotest 33/300, Serial N°: 123861) supplied by the Rayneri company. It was a mixer with a vertical axis.

In the following examples, 9 mineral foams according to the invention were produced. They are numbered 1 to 9. Each cement slurry and each aqueous foam carries the same number as the obtained mineral foam.

1/Production of Mineral Foams 1 to 5 According to the Invention Comprising Cement and Calcium Aluminate Cement (Variant 1):

Production of Slurries of Cement and Calcium Aluminate Cement:

Tables 1 and 2 herein below give the chemical compositions of the different cement slurries and of the aqueous foam which were used.

The slurry of Portland cement and the slurry of calcium aluminate cement were produced using the Rayneri R 602 EV mixer.

TABLE 1

| | | Formulations of cement slurries and slurries of calcium aluminate cement[1] | | | | |
|---|---|---|---|---|---|---|
| | | 1 | 2 | 3 | 4 | 5 |
| Slurry of cement | CEM I 52.5 R Cement | 42.34 | 42.34 | 55.7 | 56.15 | 56.15 |
| | Betocarb HP Entrains | 38.48 | 38.48 | 0 | 0 | 0 |
| | Durcal 1 (batch ADD-0613) | 0 | 0 | 22.41 | 22.59 | 22.59 |
| | calcium sulphate (CaSO$_4$) | 2.12 | 2.12 | 3.90 | 2.81 | 2.81 |
| | Water | 16.94 | 16.94 | 17.82 | 18.02 | 18.02 |
| | Plasticizer | 0.13 | 0.13 | 0.16 | 0.17 | 0.17 |
| Slurry of calcium aluminate cement | Calcium aluminate cement | 73.8 | 73.8 | 73.8 | 73.8 | 73.8 |
| | Water | 25.83 | 25.83 | 25.83 | 25.83 | 25.83 |
| | Citric acid | 0.37 | 0.37 | 0.37 | 0.37 | 0.37 |

[1]The quantities in Table 1 are given in % by mass relative to the total mass of each slurry.

TABLE 2

| | Formulation of the aqueous foam[3] | | | | |
|---|---|---|---|---|---|
| | 1 | 2 | 3 | 4 | 5 |
| Foaming agent: Propump 26[2] | 4.5 | 4.5 | 4.5 | 4.5 | 4.5 |
| Water | 95.5 | 95.5 | 95.5 | 95.5 | 95.5 |

[2]the quantity of Propump 26 is the quantity of active material for the commercial product.
[3]the quantities of Table 2 are given in % by mass relative to the total mass of aqueous foam (water + foaming agent)

Production of a Slurry of Foamed Cement According to the Invention:

The production of slurries of foamed cement (1 to 5) was carried out in a continuous manner. The cement slurries, obtained beforehand, were each poured separately into a buffer vessel whilst being stirred in a Rayneri Turbotest mixer (MEXP-101) comprising a deflocculating blade (the speed of the blade could vary from 1000 rpm to 400 rpm depending on the volume of the slurry). The slurries were pumped for the flow rates given in Table 3 using a Moineau volumetric pump:

Seepex™ MD 003-12 helical rotor pump—commission N°: 245928 for the slurry of calcium aluminate cement; and Seepex™ BN025-12 helical rotor pump—commission N° 244921 for the cement slurry;

Table 3 herein below presents the flow values of each ingredient (cement slurry and aqueous foam) used to produce the slurries of foamed cement according to the invention.

TABLE 3

| | Flow rates of the cement slurries and the slurries of calcium aluminate cement and the aqueous foam | | | | |
|---|---|---|---|---|---|
| | 1 | 2 | 3 | 4 | 5 |
| Cement slurry[4] | 1584 | 2906 | 3197 | 3302 | 3370 |
| Slurry of calcium aluminate cement[4] | 30.95 | 58.4 | 124.28 | 124.28 | 184.67 |
| Aqueous foam[4] | 288.18 | 288.18 | 263.4 | 279.92 | 288.18 |
| Average D50 of the bubbles of the mineral foam (μm) | 250 | 250 | 250 | 250 | 250 |
| Air flow rate in L/min | 4.5 | 4.5 | 4.5 | 4.5 | 4.5 |

[4]the flow rates are given in g/min

Production of the Aqueous Foam:

The aqueous solution of the foaming agent was co-introduced through the foamer[*] with the pressurized air (within a range of 1 to 6 bars) using a T junction. The aqueous foam was generated in a continuous manner at the flow rate given in Table 3,

[*] (bed of SB30 glass beads with a diameter comprised from 0.8 to 1.4 mm, packed in a tube: length 100 mm and diameter 12 mm).

The slurry of cement and the slurry of calcium aluminate cement were combined to obtain a third slurry of cement. Then, the third slurry of cement was combined with the aqueous foam already circulating in the circuit of the process. The slurry of foamed cement according to the invention was thus generated. The static mixer was the Kenics® type of mixer, supplied by Robbins & Myers Inc., with 16 elements, interior diameter: 20 mm, length: 260 mm.

Five slurries of foamed cement were obtained, numbered from 1 to 5; their compositions are given in Table 4 herein below.

TABLE 4

| | Formulations of the slurries of foamed cement[6] | | | | |
|---|---|---|---|---|---|
| | 1 | 2 | 3 | 4 | 5 |
| CEM I 52.5 R Cement | 35.24 | 36.33 | 49.68 | 50.14 | 49.29 |
| calcium sulphate (CaSO$_4$) | 1.76 | 1.82 | 3.48 | 2.51 | 2.46 |
| Calcium aluminate cement | 1.20 | 1.77 | 2.56 | 2.48 | 3.59 |
| Betocarb HP Entrains | 32.02 | 33.01 | 0 | 0 | 0 |
| Durcal 1 (batch ADD-0613) | 0 | 0 | 19.99 | 20.18 | 19.83 |
| Plasticizer | 0.11 | 0.11 | 0.15 | 0.15 | 0.15 |
| Citric acid | 0.01 | 0.01 | 0.01 | 0.01 | 0.02 |
| Foaming agent[5] | 0.68 | 0.53 | 0.33 | 0.34 | 0.34 |
| Water | 30.34 | 27.48 | 24.53 | 24.89 | 25.00 |
| CaSO4/cement ratio | 0.05 | 0.05 | 0.07 | 0.05 | 0.05 |
| Calcium aluminate cement/CaSO4 ratio | 0.68 | 0.97 | 0.73 | 0.98 | 1.46 |

[5]the quantity of foaming agent is the quantity of active material for the commercial product.
[6]the quantities of Table 4 are given in % by mass relative to the total mass of the slurry of foamed cement Production of Mineral Foams According to the Invention:

The slurries of foamed cement 1 to 5 were then either poured into columns of Plexiglas: 1 or 2 meters in height and 10 cm diameter, or into 10×10×10 cm-side cubes of polystyrene. The cubes were demoulded after 24 h00 and kept for 28 days at 100% of relative humidity and 20° C. The columns were demoulded after 24 h00, kept for 7 days at 100% of relative humidity and 20° C., then dried at 45° C. until their mass remained constant.

Stability of the Mineral Foams According to the Invention:

After drying at 45° C. and obtaining a constant mass, sections in the columns were cut at 2 cm from the bottom and 2 cm from the top of the column. The sections were 10 centimeters high. The sections were carefully measured and the densities were evaluated. The density obtained at the bottom of the column and the difference of density between the top and the bottom of the column are recorded in Table 5.

TABLE 5

| | Stability of the columns | | | | |
|---|---|---|---|---|---|
| | 1 | 2 | 3 | 4 | 5 |
| Dry density at the bottom of the column (kg/m$^3$) | 271 | 447 | 467 | 466 | 471 |
| Difference of density between the top and bottom on the 1-metre column (in %) | 0.4 | 7.5 | n.d. | n.d. | n.d. |
| Difference of density between the top and bottom on the 2-metre column (in %) | n.d. | n.d. | 17.6 | 14 | 17.63 | n.d. not determined

Thermal Conductivity of the Mineral Foams According to the Invention:

Thermal conductivity was measured using a thermal conductivity measuring device: the CT-meter (Resistance 5Ω, probe wire 50 mm). The samples were dried in a drying oven at 45° C. until their mass remained constant. The sample was then cut into two equal pieces using a saw. The measurement probe was placed between the two flat sides of these two half samples (the sawed sides). Heat was transmitted from the source towards the thermocouple through the material surrounding the probe. The rise in temperature of the thermocouple was measured over time and the thermal conductivity of the sample was calculated.

The values are given in Table 6.

TABLE 6

| | Thermal conductivity | | | | |
|---|---|---|---|---|---|
| | 1 | 2 | 3 | 4 | 5 |
| Thermal conductivity (W/m · K) | 0.114 | 0.188 | 0.159 | 0.166 | 0.164 |

Mechanical Compressive Strengths of the Mineral Foams:

The mechanical strength was tested on the 10×10×10 cm cubes. Each sample was submitted to mechanical compressive stress until failure of the sample using a Zwick™ press (PRES-0018-1997/03). The maximum force exerted on the surface of the sample was measured in this manner. A compressive strength was deduced. The measurements were carried out in a temperature-stabilised environment (23° C.) and 50% relative humidity. The results obtained are given in Table 7. Each value is an average of three measurements.

TABLE 7

| | Compressive strength | | | | |
|---|---|---|---|---|---|
| | 1 | 2 | 3 | 4 | 5 |
| Compressive strength (Pa) | 0.21 | 1.29 | 2.73 | 2.66 | 2.83 |

2/Production of Mineral Foams 6 to 8 According to the Invention Comprising Cement and Fine Particles (Variant 2)

Production of Slurries of Portland Cement:

Tables 8 and 9 herein below present the chemical compositions of the slurries of cement (Table 8) and the aqueous foam (Table 9) which were used.

TABLE 8

| | Formulation of slurries of cement[7] | | |
|---|---|---|---|
| | 6 | 7 | 8 |
| CEM I 52.5 R cement | 58.88 | 58.88 | 56.42 |
| Durcal 1 (batch: ADD-00662) | 22.08 | 22.08 | 21.08 |
| Socal 31 | 0 | 0 | 4.23 |
| Plasticizer | 0.26 | 0.26 | 0.34 |
| Retarder | 0.24 | 0.24 | 0.23 |
| Water | 18.53 | 18.53 | 17.71 |
| W/C | 0.31 | 0.31 | 0.31 |
| Fines/cement ratio | 0.375 | 0.375 | 0.373 |
| Ultra fines/fines ratio | 0 | 0 | 0.2 |

[7] The quantities in Table 8 are given in % by mass relative to the total mass of each slurry.

TABLE 9

| | Formulation of aqueous foam [9] | | |
|---|---|---|---|
| | 6 | 7 | 8 |
| Foaming agent Propump 26[8] | 4.24 | 4.5 | 4.24 |
| Accelerator | 15.38 | 0 | 15.28 |
| thickening agent | 0.07 | 0 | 0 |
| Water | 80.32 | 95.5 | 80.47 |

[8] the quantity of Propump 26 is the quantity of active material of the commercial product.
[9] The quantities in Table 9 are given in % by mass relative to the total mass of aqueous foam (water + foaming agent)

Production of a Slurry of Foamed Cement According to the Invention:

The production of slurries of foamed cement (6 to 8) was carried out in a continuous manner. The cement slurries, obtained beforehand, were poured into a buffer vessel whilst being stirred in a Rayneri Turbotest mixer (MEXP-101) comprising a deflocculating blade (the speed of the blade could vary from 1000 rpm to 400 rpm depending on the volume of the slurry). The slurries were pumped for the flow rates given in Table 10 using a Moineau volumetric pump (Seepex™ MD 003-12 helical rotor pump—commission N°: 245928).

Table 10 herein below presents the flow rates for each ingredient (slurry of cement and aqueous foam) used to produce the slurries of foamed cement according to the invention.

TABLE 10

| | 6 | 7 | 8 |
|---|---|---|---|
| Cement slurry (g/min) | 3370 | 4296 | 4072 |
| Aqueous foam (g/min) | 296 | 276 | 314 |

TABLE 10-continued

| | 6 | 7 | 8 |
|---|---|---|---|
| Average D50 of the bubbles of the aqueous foam (μm) | 251 | 250 | 250 |
| Air flow rate (L/min) | 5.2 | 5.2 | 5.2 |

Production of the Aqueous Foam:

The aqueous solution of the foaming agent was co-introduced through the foamer[*] with the pressurized air (within a range of 1 to 6 bars) using a T junction. The aqueous foam was generated in a continuous manner at the flow rate given in Table 10;

[*] (bed of SB30 glass beads with a diameter comprised from 0.8 to 1.4 mm, packed in a tube: length 100 mm and diameter 12 mm).

The slurry of cement and the aqueous foam already circulating in the circuit of the process were combined. The slurries of foamed cement according to the invention were then generated. The static mixer was the Kenics® type of mixer supplied by Robbins & Myers Inc., with 16 elements, interior diameter: 20 mm, length: 260 mm.

TABLE 11

Formulation of the slurries of foamed cements [11]

| | 6 | 7 | 8 |
|---|---|---|---|
| CEM I 52.5 R cement | 54.94 | 55.47 | 52.62 |
| Durcal 1 (lot ADD-00662) | 20.60 | 20.80 | 19.66 |
| Socal 31 | 0 | 0 | 3.95 |
| Plasticizer | 0.12 | 0.12 | 0.16 |
| Retarder | 0.05 | 0.06 | 0.05 |
| Thickening agent | 0.005 | 0 | 0 |
| Foaming agent[10] | 0.08 | 0.07 | 0.08 |
| Accelerator | 0.31 | 0 | 0.26 |
| Water | 24.23 | 23.48 | 23.23 |
| Fine mineral particles/cement ratio | 0.37 | 0.37 | 0.37 |
| Ultrafine mineral particles/fine mineral particles ratio | 0 | 0 | 0.20 |

[10] the quantity of foaming agent is the quantity of active material for the commercial product.
[11] the quantities of Table 11 are given in % by mass relative to the total mass of foamed cement slurry Production of Mineral Foams According to the Invention:

The slurries of foamed cement 6 to 8 were then either poured into columns of Plexiglas: 1, 2 or 3 meters in height and 20 cm diameter, or into 10×10×10 cm-side cubes of polystyrene. The cubes were demoulded after 24 h00 and kept for 28 days at 100% of relative humidity and 20° C. The columns were demoulded after 24 h00, kept for 7 days at 100% of relative humidity and 20° C., then dried at 45° C. until their mass remained constant.

Stability of the Mineral Foams 6 to 8 According to the Invention:

After drying at 45° C. and obtaining a constant mass, sections in the columns were cut at 2 cm from the bottom and 2 cm from the top of the column. The sections were 10 centimeters high. The sections were carefully measured and the densities were evaluated. The density obtained at the bottom of the column and the difference of density between the top and the bottom of the column are recorded in Table 12.

TABLE 12

| | 6 | 7 | 8 |
|---|---|---|---|
| Dry density at the bottom of the column (kg/m³) | 487 | 537 | 568 |

TABLE 12-continued

| | 6 | 7 | 8 |
|---|---|---|---|
| Difference of density between the top and bottom on the 1-metre column (in %) | 7.6 | 8.9 | 10.7 |
| Difference of density between the top and bottom on the 2-metre column (in %) | 16.4 | 15 | 17 |
| Difference of density between the top and bottom on the 3-metre column (in %) | 23 | 24 | 24 |

Thermal Conductivity of the Mineral Foams 6 to 8 According to the Invention:

Thermal conductivity was measured using a thermal conductivity measuring device: the CT-meter (Resistance 5Ω, probe wire 50 mm). The samples were dried in a drying oven at 45° C. until their mass remained constant. The sample was then cut into two equal pieces using a saw. The measurement probe was placed between the two flat sides of these two half samples (the sawed sides). Heat was transmitted from the source towards the thermocouple through the material surrounding the probe. The rise in temperature of the thermocouple was measured over time and the thermal conductivity of the sample was calculated. The values are given in Table 13.

TABLE 13

| | Thermal conductivity | | |
|---|---|---|---|
| | 6 | 7 | 8 |
| Thermal conductivity (W/m · K) | 0.132 | 0.172 | 0.168 |

Mechanical Compressive Strengths of the Mineral Foams 6 to 8:

The mechanical strength was tested on the 10×10×10 cm cubes. Each sample was submitted to mechanical compressive stress until failure of the sample using a Zwick™ press (PRES-0018-1997/03). The maximum force exerted on the surface of the sample was measured in this manner. A compressive strength was deduced. The measurements were carried out in a temperature-stabilised environment (23° C.) and 50% relative humidity. The results obtained are given in Table 14. Each value is an average of three measurements.

TABLE 14

| | Compressive strength | | |
|---|---|---|---|
| | 6 | 7 | 8 |
| Compressive strength (Pa) | n.d. | 2.31 | 2.96 | n.d. not determined

3/Production of a Mineral Foam 9 According to the Invention Comprising Cement (Variant 3)

The mineral foam 9 was produced according to the same process as the foams 6 to 8. This mineral foam 9 was produced from cement obtained from the clinker described in patent application WO 2006/018569 (cement A).

The chemical composition of the cement slurry was the following:

| | 9 [12] |
|---|---|
| Cement A | 72.22 |
| Thickening agent | 0.02 |

-continued

|  | 9 [12] |
|---|---|
| Plasticizer | 0.65 |
| Water | 27.11 |

[12] The quantities are given in % by mass relative to the total mass of each slurry.

The chemical composition of the aqueous foam was the following:

|  | 9 [14] |
|---|---|
| Foaming agent: Propump 26[13] | 4.5 |
| LiCO3 | 0.11 |
| Water | 95.4 |

[13] the quantity of foaming agent is the quantity of active material for the commercial product.
[14] the quantities of the table are given in % by mass relative to the total mass of the aqueous foam (water + foaming agent)

Flow Rates of the Slurry of Cement and the Aqueous Foam

|  | 9 |
|---|---|
| Cement slurry (g/min) | 4016 |
| Aqueous foam (g/min) | 259 |
| Average D50 of the bubbles of the aqueous foam (μm) | 250 |
| Air flow rate (L/min) | 5.3 |

Formulation of the Slurry of Foamed Cement

|  | 9 [16] |
|---|---|
| Cement A | 67.84 |
| Plasticizer | 0.31 |
| Thickening agent | 0.005 |
| Foaming agent [15] | 0.07 |
| Lithium carbonate | 0.0016 |
| Water | 31.78 |

[15] the quantity of foaming agent is the quantity of active material for the commercial product.
[16] the quantities are given in % by mass relative to the total mass of the slurry of foamed cement

|  | 9 |
|---|---|
| Dry density for the bottom of the column (kg/m³) | 536 |
| Difference of density between the top and bottom of the 1-metre column (in %) | 1.3 |
| Difference of density between the top and bottom of the 2-metre column (in %) | 19.4 |
| Difference of density between the top and bottom of the 3-metre column (in %) | 21 |

The obtained thermal conductivity value was 0.117 W/m·K. The obtained compressive strength was 1.88 Pa.

The invention claimed is:

1. A process for production of a mineral foam continuously comprising:
   (i) separately preparing one or more slurries of cement, and an aqueous foam for which a D50 of bubbles is less than or equal to 400 μm;
   (ii) homogenizing the one or more slurries of cement with the aqueous foam to obtain a slurry of foamed cement;
   (iii) casting the slurry of foamed cement without interruption and leaving the cast slurry of foamed cement to set,
   wherein said slurry of foamed cement comprises at least, in % by mass relative to the mass of the slurry of foamed cement:
      from 20 to 70% of cement;
      from 1 to 5% of calcium sulfate;
      from 0.5 to 10% of calcium aluminate cement;
      from 0.05 to 3% of a water reducer, a plasticizer or a superplasticizer;
      from 0.001 to 0.5% of a retarder;
      from 0.1 to 5% of a foaming agent;
      from 15 to 40% of water;
      the calcium aluminate cement/calcium sulphate ratio being from 0.5 to 2.5, wherein said calcium aluminate cement and said calcium sulphate are expressed in mass percentage;
      the calcium sulphate/cement ratio being from 0.03 to 0.09; wherein said calcium sulphate and said cement are expressed in mass percentage.

2. The process for production of a mineral foam according to claim 1, wherein step (i) comprises the preparation of two slurries of cement, one of which is a slurry of calcium aluminate cement.

3. The process for production of a mineral foam according to claim 1, wherein step (ii) comprises the introduction of the slurry or slurries of cement and the aqueous foam into a static mixer to obtain a slurry of foamed cement.

4. The process for production of a mineral foam according to claim 1, wherein the aqueous foam is generated continuously.

5. The process for production of a mineral foam according to claim 1, wherein the one or more slurries of cement is/are generated continuously.

6. The process for production of a mineral foam according to claim 3, wherein the static mixer includes elements in the form of a propeller to ensure complete radial mixing and successive divisions of flow for each combination of liquids and gas.

7. The process for production of a mineral foam according to claim 3, wherein the static mixer includes helical elements which transmit a radial speed to fluid, which is directed alternatively towards a side of the mixer, then towards a centre of the mixer.

8. The process for production of a mineral foam according to claim 1, wherein the slurry of foamed cement comprises a foaming agent that is a protein.

9. The process for production of a mineral foam according to claim 8, wherein the foaming agent is keratin.

10. A process for production of a mineral foam continuously comprising:
   (i) separately preparing one or more slurries of cement, and an aqueous foam for which the D50 of the bubbles is less than or equal to 400 μm;
   (ii) homogenizing the one or more slurries of cement with the aqueous foam to obtain a slurry of foamed cement;
   (iii) casting the slurry of foamed cement without interruption and leave it to set;
   wherein said slurry of foamed cement comprises at least, in % by mass relative to the mass of the slurry of foamed cement:
      from 30 to 75% of cement described according to the European NF EN 197-1 Standard of February 2001 or mixtures thereof;
      from 10 to 70% of fine mineral particles with a D50 less than or equal to 5 μm;
      from 0 to 15% of ultrafine mineral particles with a D50 less than or equal to 1 μm;

from 0.05 to 3% of a water reducer, a plasticizer or a superplasticizer;

from 0.0001 to 1% of a retarder;

from 0 to 0.1% of a thickening agent;

from 0.01 to 5% of a foaming agent;

from 0 to 0.5% of alkaline sulphates;

from 0 to 1% of an accelerator;

from 10 to 70% of water;

the fine mineral particles/cement ratio being comprised from 0.27 to 0.6, wherein said fine mineral particles and said cement are expressed in mass percentage;

the ultrafine mineral particles/fine particles ratio being comprised from 0 to 0.5, wherein said ultrafine mineral particles and said fine mineral particles are expressed in mass percentage.

11. The process for production of a mineral foam according to claim 10, wherein step (ii) comprises the introduction of the slurry or slurries of cement and the aqueous foam into a static mixer to obtain a slurry of foamed cement.

12. The process for production of a mineral foam according to claim 10, wherein the aqueous foam is generated continuously.

13. The process for production of a mineral foam according to claim 10, wherein the one or more slurries of cement is/are generated continuously.

14. The process for production of a mineral foam according to claim 11, wherein the static mixer have elements in the form of a propeller to ensure complete radial mixing and successive divisions of flow for each combination of liquids and gas.

15. The process for production of a mineral foam according to claim 11, wherein the static mixer have helical elements which transmit a radial speed to fluid, which is directed alternatively towards a side of the mixer, then towards a centre of the mixer.

16. The process for production of a mineral foam according to claim 10, wherein the slurry of foamed cement comprises a foaming agent that is a protein.

17. The process for production of a mineral foam according to claim 16, wherein the foaming agent is keratin.

* * * * *